United States Patent
Bengtsson et al.

(10) Patent No.: US 10,457,130 B2
(45) Date of Patent: Oct. 29, 2019

(54) LOCK BODY ASSEMBLY, POWER BATTERY, LOCK-UP MECHANISM AND METHOD OF USE THEREOF, AND VEHICLE

(71) Applicant: NIO NEXTEV LIMITED, Central Hong Kong (CN)

(72) Inventors: Jan Bengtsson, Hong Kong (CN); Nan Li, Hong Kong (CN)

(73) Assignee: NIO NEXTEV LIMITED, Hong Kong (CN)

( * ) Notice: Subject to any disclaimer, the term of this patent is extended or adjusted under 35 U.S.C. 154(b) by 0 days.

(21) Appl. No.: 16/312,381

(22) PCT Filed: May 12, 2017

(86) PCT No.: PCT/CN2017/084072
§ 371 (c)(1),
(2) Date: Dec. 21, 2018

(87) PCT Pub. No.: WO2017/219784
PCT Pub. Date: Dec. 28, 2017

(65) Prior Publication Data
US 2019/0202276 A1    Jul. 4, 2019

(30) Foreign Application Priority Data

Jun. 23, 2016    (CN) .......................... 2016 1 0459502

(51) Int. Cl.
*B60K 1/00*    (2006.01)
*B60K 1/04*    (2019.01)
(Continued)

(52) U.S. Cl.
CPC .................. *B60K 1/04* (2013.01); *B60S 5/06* (2013.01); *F16B 39/10* (2013.01); *B60K 2001/0455* (2013.01)

(58) Field of Classification Search
CPC .... B60K 1/04; B60K 1/00; B60K 2001/0455; B60K 2001/0488; B60K 2001/0472;
(Continued)

(56) References Cited

U.S. PATENT DOCUMENTS 5,052,198 A * 10/1991 Watts ...................... B60R 16/04
                                                    180/68.5
7,641,013 B2 * 1/2010 Kim ........................ B60R 16/04
                                                    180/68.5
(Continued)

FOREIGN PATENT DOCUMENTS

CN    102815190    12/2012
CN    103108762    5/2013
(Continued)

OTHER PUBLICATIONS

Official Action with English Translation for China Patent Application No. 201610459502.X, dated Sep. 1, 2017, 8 pages.
(Continued)

*Primary Examiner* — James M Dolak
(74) *Attorney, Agent, or Firm* — Sheridan Ross P.C.

(57) ABSTRACT

The invention relates to a lock assembly for a battery lock-up mechanism, a power battery comprising the lock assembly, a battery lock-up mechanism, a new energy vehicle, and a method for installing/detaching a power battery onto/from a new energy vehicle by using the battery lock-up mechanism of the invention. The lock assembly for battery lock-up mechanism comprises a casing and a stop end plate which define an accommodation space. A returning spring, a push rod, a locking pin or the like are installed in a central pull shaft. The technical solutions of the invention have a low cost, are easy to operate and are stable and reliable.

20 Claims, 3 Drawing Sheets

(51) Int. Cl.
*F16B 39/10* (2006.01)
*B60S 5/06* (2019.01)

(58) Field of Classification Search
CPC ... B60K 2001/0494; B60S 5/06; B60L 53/80; H01M 2/1083; H01M 2/1016
See application file for complete search history.

(56) References Cited

U.S. PATENT DOCUMENTS

| | | | | |
|---|---|---|---|---|
| 8,097,359 | B2* | 1/2012 | Gau | H01M 2/1005 429/187 |
| 8,113,311 | B2* | 2/2012 | Herrmann | B60L 50/66 180/68.5 |
| 8,915,321 | B2* | 12/2014 | Lejeune | B60K 1/04 180/68.5 |
| 8,973,468 | B2* | 3/2015 | Escande | H01M 2/1083 81/54 |
| 9,162,653 | B2* | 10/2015 | Escande | B60K 1/04 |
| 9,290,088 | B2* | 3/2016 | Lejeune | B60K 1/04 |
| 2008/0268330 | A1* | 10/2008 | Hansen | H01M 2/202 429/97 |
| 2010/0145717 | A1* | 6/2010 | Hoeltzel | B60K 1/04 705/1.1 |
| 2012/0110831 | A1* | 5/2012 | Escande | B60K 1/04 29/592.1 |
| 2012/0230762 | A1* | 9/2012 | Ruff | F16B 21/02 403/349 |
| 2012/0305323 | A1* | 12/2012 | Baboy | B60K 1/04 180/68.5 |

FOREIGN PATENT DOCUMENTS

| | | |
|---|---|---|
| CN | 103332173 | 10/2013 |
| CN | 103600644 | 2/2014 |
| CN | 203511606 | 4/2014 |
| CN | 105059267 | 11/2015 |
| CN | 206031346 | 3/2017 |
| FR | 2964622 | 3/2012 |
| JP | S57-501570 | 9/1982 |
| JP | 2013-066290 | 4/2013 |

OTHER PUBLICATIONS

Notice of Allowance with English Translation for China Patent Application No. 201610459502.X, dated Nov. 7, 2017, 6 pages.
International Search Report prepared by the State Intellectual Property Office of the P.R. China on Jul. 28, 2017, for International Application No. PCT/CN2017/084072.

* cited by examiner

LOCK BODY ASSEMBLY, POWER BATTERY, LOCK-UP MECHANISM AND METHOD OF USE THEREOF, AND VEHICLE

CROSS REFERENCE TO RELATED APPLICATIONS

This application is a national stage application under 35 U.S.C. 371 and claims the benefit of PCT Application No. PCT/CN2017/084072 having an international filing date of 12 May 2017, which designated the United States, which PCT application claimed the benefit of China Patent Application No. 201610459502.X filed 23 Jun. 2016, the disclosure of each of which are incorporated herein by reference.

FIELD OF THE INVENTION

The invention pertains to the technical field of new energy vehicle; in particular, the invention relates to a lock assembly for a battery lock-up mechanism of new energy vehicle, and further relates to a power battery comprising the lock assembly, a battery lock-up mechanism and a method of use, as well as a new energy vehicle comprising the battery lock-up mechanism.

BACKGROUND OF THE INVENTION

New energy vehicle has nowadays become a focus of research.

New energy automobile is a typical kind of new energy vehicle, in which the electrical energy of the battery is generally used to assist or replace a conventional internal combustion engine so as to provide power to the automobile. Hereinafter, the new energy automobile will be mainly used an example for description. It can be understood that similar description is also applicable to other kinds of new energy vehicles.

For existing plug-in new energy automobiles, the power batteries of the automobiles have problems that the time for waiting for charging is long, an inappropriate operation is apt to affect the service life of the battery, etc. Therefore, a battery swap new energy automobile relatively receives more favors from the users. Consumers of the battery swap new energy automobile do not have to wait for charging of the battery; instead, professionals at a battery swap station use professional devices to perform a quick battery swap operation on the automobile.

As a non-limiting example, the power battery of an existing battery swap new energy automobile is fixed to the body of the automobile (e.g., the chassis) through a battery lock-up mechanism. As can be seen, as compared with lock-up devices in other technical fields, the battery lock-up mechanism of a battery swap system of the new energy automobile, under the premise of cost control, also has to meet requirements on a convenient operation and a stable and reliable locking-up, thus bringing about new challenges to the design, manufacture and production. The same is true for other new energy vehicles.

SUMMARY OF THE INVENTION

An object of the invention is to provide a lock assembly for a battery lock-up mechanism of new energy vehicle, which has a low cost, is easy to operate and is stable and reliable. Further, the object of the invention is further to provide a power battery of automobile comprising the lock assembly, a battery lock-up mechanism and a method of use, as well as a new energy vehicle comprising the battery lock-up mechanism.

In order to achieve the above objects, a first aspect of the invention provides a lock assembly for a battery lock-up mechanism, and the battery lock-up mechanism further comprises a fixing assembly which is adapted to be connected to a new energy vehicle, the lock assembly comprising:

a hollow casing which is opened at a bottom end and has a first through hole at a top end;
a stop end plate formed with a second through-hole at the center of the stop end plate and formed with a groove in an indexed arrangement that passes through the second through-hole, the stop end plate and the casing engaging with each other to define an accommodation space; and
a hollow central pull shaft having a columnar portion, a lug portion, and a flange portion between the columnar portion and the lug portion, the columnar portion having a closed top end that passes through the second through hole of the stop end plate and the first through hole of the casing, the closed top end having a first connection structure adapted to engage with a second connection structure on the fixing assembly for restricting a relative axial movement of the fixing assembly and the lock assembly, the columnar portion being formed with a radially penetrating notch at a position adjacent to the flange portion, and the flange portion having a diameter larger than the diameter of the columnar portion and the diameter of the lug portion and also larger than the diameter of the second through hole;
the lock assembly further comprises a return spring, a push rod and a locking pin, wherein:
the return spring is positioned in the central pull shaft, one end of the push rod has a radially penetrating third through hole and extending into the central pull shaft, another end of the push rod extends out of the central pull shaft from the lug portion, the return spring urges the push rod, and the locking pin passes through the notch and the third through hole in the accommodation space.

Optionally, in the above described lock assembly, the casing is of a columnar shape.

Optionally, in the above described lock assembly, the flange portion of the central pull shaft is of a circular disc shape.

Optionally, in the above described lock assembly, the groove in an indexed arrangement is a "-" shaped groove, a cross-shaped groove, a "*" shaped groove or a star-shaped groove.

Optionally, in the above described lock assembly, the first connection structure is an external thread.

Optionally, in the above described lock assembly, a washer is disposed in the first through hole of the casing.

Optionally, in the above described lock assembly, the stop end plate is bolt-connected, adhered or welded to a bottom end of the casing.

In order to achieve the above objects, a second aspect of the invention provides a power battery for new energy vehicle, and a battery housing of the power battery is provided with the lock assembly according to any item of the above first aspect.

In order to achieve the above objects, a third aspect of the invention provides a battery lock-up mechanism which comprises a lock assembly adapted to be connected to a battery housing of a power battery for new energy vehicle, wherein the lock assembly is the lock assembly according to any item of the above first aspect, and the battery lock-up mechanism further comprises the fixing assembly adapted to be connected to the new energy vehicle.

Optionally, in the above described battery lock-up mechanism, the fixing assembly comprises a fixing frame and a locking plate, the locking plate is assembled to the new energy vehicle through the fixing frame, and the central pull shaft engages with the locking plate.

In order to achieve the above objects, a fourth aspect of the invention provides a new energy vehicle which comprises a power battery assembled using the battery lock-up mechanism according to any item of the above third aspect.

Optionally, in the above described new energy vehicle, the lock assembly is fixed to the power battery through an intermediate connector, the lock assembly is connected inside the intermediate connector through interference fit, and the intermediate connector is fixed to a battery housing of the power battery by welding.

Optionally, in the above described new energy vehicle, the intermediate connector is a sleeve which is welded inside a bore in the battery housing.

Optionally, the above described new energy vehicle is a new energy automobile, and the fixing assembly is connected to a chassis of the body of the new energy automobile.

In order to achieve the above objects, a fifth aspect of the invention provides a method for installing/detaching a power battery onto/from a new energy vehicle by using the battery lock-up mechanism according to any item of the above third aspect, wherein the installing steps comprise: (1) aligning the power battery having the lock assembly for the battery lock-up mechanism with the new energy vehicle which is connected with the fixing assembly for the battery lock-up mechanism; (2) pushing the push rod upward so that the locking pin is disengaged from the groove of the stop end plate, and then driving the lug portion circumferentially so as to rotate the central pull shaft and make the central pull shaft engage with the locking plate; and (3) releasing the push rod when an appropriate locking angle or torque is reached so that the return spring pushes the central pull shaft to return to the position of the locking pin in the groove of the stop end plate, thus restricting turning of the central pull shaft; and/or the detaching steps comprise: (1) pushing the push rod upward so that the locking pin is disengaged from the groove of the stop end plate, and then driving the lug portion circumferentially so as to rotate the central pull shaft and make the central pull shaft disengage from the locking plate; (2) releasing the push rod after the central pull shaft is disengaged from the locking plate so that the return spring pushes the central pull shaft to return to the position of the locking pin in the groove of the stop end plate, thus restricting turning of the central pull shaft; and (3) moving the power battery having the lock assembly away from the body of automobile.

BRIEF DESCRIPTION OF THE ACCOMPANYING DRAWINGS

The disclosure of the invention will become clearer with reference to the accompanying drawings. It should be understood that these drawings are merely provided for the purpose of illustration, and are not intended to limit the scope of protection of the invention. In the drawings.

DETAILED DESCRIPTION OF THE PREFERRED EMBODIMENTS

Specific embodiments of the invention will be described in detail below with reference to the accompanying drawings, in which identical reference signs denote identical or corresponding technical features.

Hereinafter, the present application will be described in detail on new energy automobiles. However, it should be known that the present application can be applied to other new energy vehicles, too.

Figure 1:
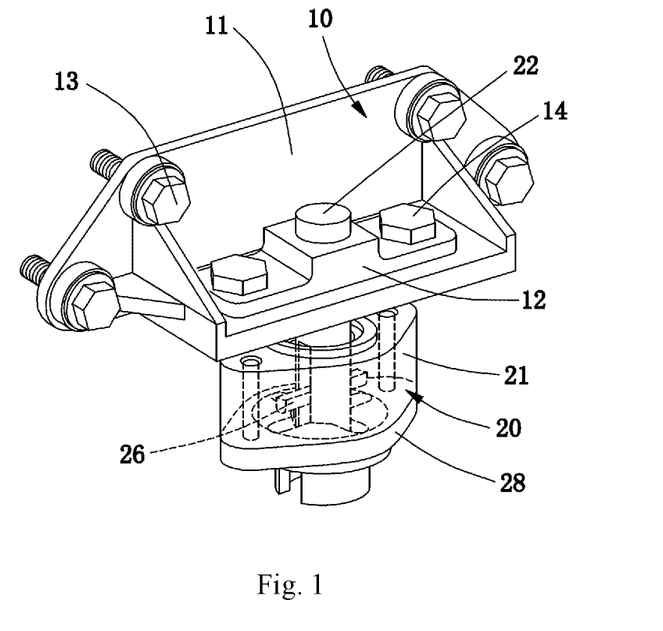
FIG. 1 is a schematic assembled perspective view of a battery lock-up mechanism according to an embodiment of the invention.
Figure 4:
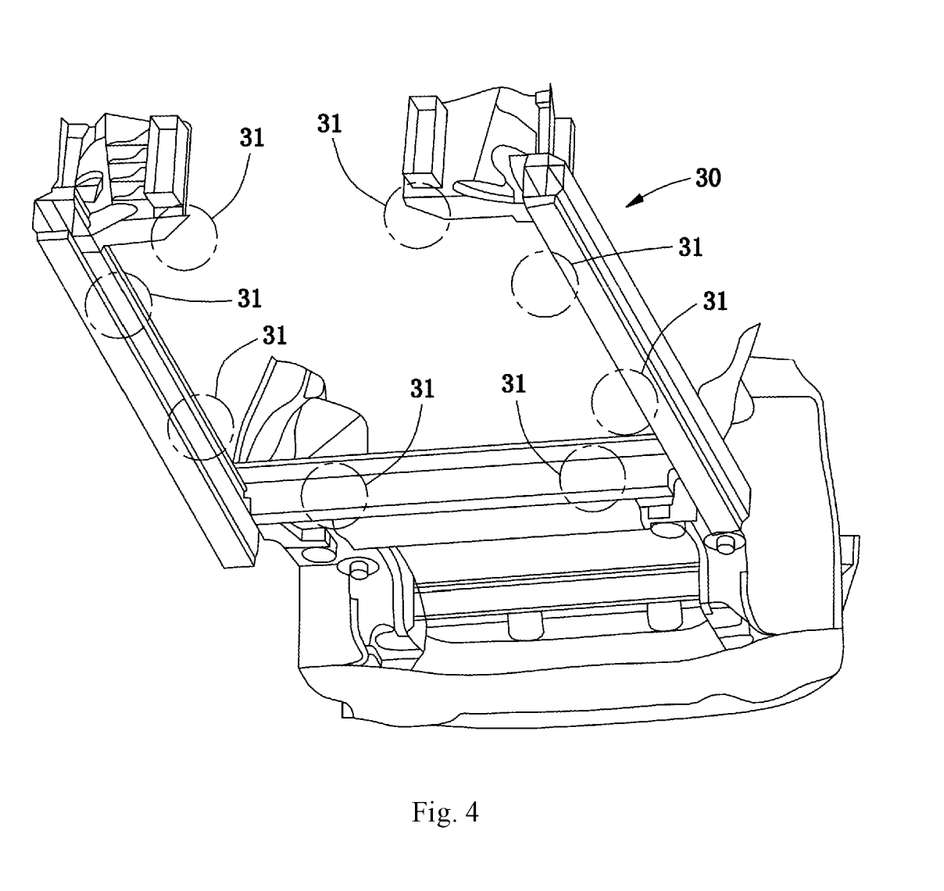
FIG. 4 is an example showing the arrangement of the battery lock-up mechanism on the chassis of automobile.

FIG. 1 is a schematic assembled perspective view of a battery lock-up mechanism according to an embodiment of the invention. As can be known, in a practical application, one or more similar battery lock-up mechanisms can be arranged appropriately so as to fixedly install the power battery of an automobile (or other vehicles; the same applies below) to the body of the new energy automobile (or other new energy vehicles; the same applies below) in a detachable manner, e.g., the chassis of automobile. FIG. 4 shows an example of a specific arrangement of the connection positions (i.e., the encircled positions) of the battery lock-up mechanism on the body of the automobile.

While an example in which the power battery of automobile is assembled to the chassis of the body of automobile is described in the application, according to the teaching of the invention, those skilled in the art can conceive technical solutions of detachably installing the power battery to other possible suitable positions on the new energy automobile by using the battery lock-up mechanism of the invention, for example including but not limited to, trunk of the automobile, power cabin, etc.; installation at these positions will not be described in detail in the application document.

As can be seen from FIG. 1, the battery lock-up mechanism comprises a fixing assembly 10 and a lock assembly 20. The fixing assembly 10 is adapted to be connected to the body of the new energy automobile, whereas the lock assembly 20 is adapted to be connected to the battery housing of the power battery of the new energy automobile. Therefore, when the lock assembly 20 is connected to the fixing assembly 10 through for example a central pull shaft 22 thereof, the battery lock-up mechanism locks-up the power battery of automobile to the body of the new energy automobile. When a swapping of the power battery of the automobile is required, the battery lock-up mechanism can be unlocked and the power battery can be swapped.

The fixing assembly 10 as shown can comprise a fixing frame 11 and a locking plate 12, where the fixing frame 11 is for example connected to an appropriate position on the body of automobile such as the chassis of automobile via four first bolts 13, and the locking plate 12 is connected to the fixing frame 11 via two second bolts 14. It can be understood that the fixing frame 11 and the locking plate 12 each are provided with through holes or bolt holes for passing these bolts. It can be understood by those skilled in the art that in an alternative embodiment, the fixing assembly can be also a single piece, e.g., it can be formed by integrally casting the fixing frame and the locking plate so that at least one assembling step can be omitted.

FIG. 1 also illustrates the constituent members of the lock assembly 20 of the battery lock-up mechanism, e.g., a casing 21 and a stop end plate 28 that define an accommodation space together, the central pull shaft 22 passing through the casing 21, the stop end plate 28 and the accommodation space, a locking pin 26 positioned in the accommodation space and positioned in the central pull shaft 22, etc. The battery lock-up mechanism in FIG. 1 is in a locked-up state, where the central pull shaft 22 of the lock assembly 20 is bolted to the locking plate 12 of the fixing assembly 10 so that the power battery which is not shown in the figure can be fixed to the body of automobile. The disassembled parts of the lock assembly 20 is shown more clearly in the exploded view of FIG. 3.

Figure 2:
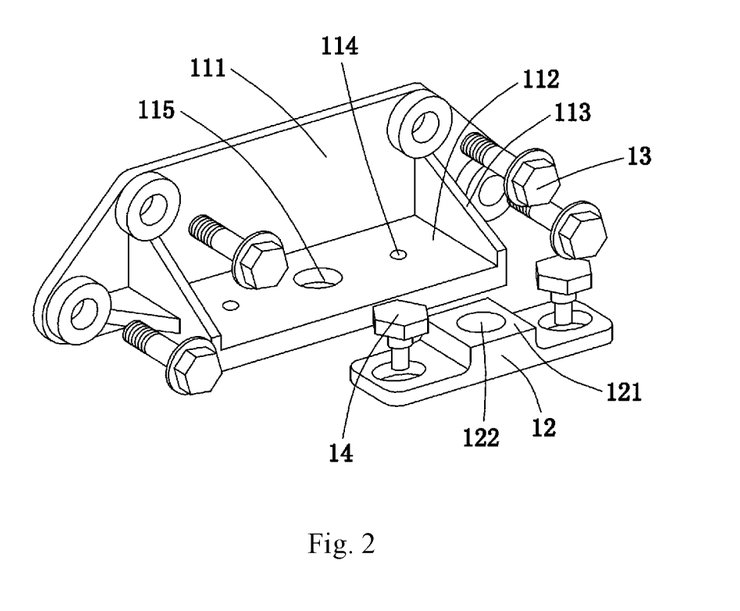
FIG. 2 is a schematic exploded perspective view of a fixing assembly of the battery lock-up mechanism in FIG. 1.

FIG. 2 is a schematic exploded perspective view of a fixing assembly of the battery lock-up mechanism in FIG. 1.

The fixing frame 11 as shown has a first side wall 111 and a second side wall 112 that are substantially perpendicular to each other. The first side wall 111 is provided with four through holes that are adapted to be passed by four first bolts 13 respectively so that the first side wall 111 can be connected to the body of automobile. The second side wall 112 is formed with two bolt holes 114 which are adapted to be passed by the second bolts 14 so as to fix the locking plate 12 of the battery lock-up mechanism. In order to reinforce the two side walls 111, 112, reinforcement ribs 113 can be formed between them. It can be understood that in different embodiments, the numbers and positions of the first bolts 13 and second bolts 14 and the corresponding through holes and bolt holes as well as the specific structure, shape, number and positions of the reinforcement ribs 113 can be changed according to specific applications so as to realize a sufficiently stable and reliable connection.

Optionally, the locking plate 12 has a thickened portion 121 at a middle portion, which is formed with a threaded hole 122 adapted to be connected to the central pull shaft 22 of the lock assembly 20 and locked together with the central pull shaft 22, thus fixing the battery in place. The thickened portion 121 has increased the connection strength of the locking plate 12 and the central pull shaft 22. The locking plate 12 is adapted to be connected to the second side wall 112 of the fixing frame 11 through the second bolts 14 and the bolt holes 114. As such, such a connection enables the threaded hole 122 to be aligned with a through hole 115 in the second side wall 112 for passing the central pull shaft 22 and to be adapted to be connected with an external thread on a locking section of the central pull shaft 22.

Figure 3:
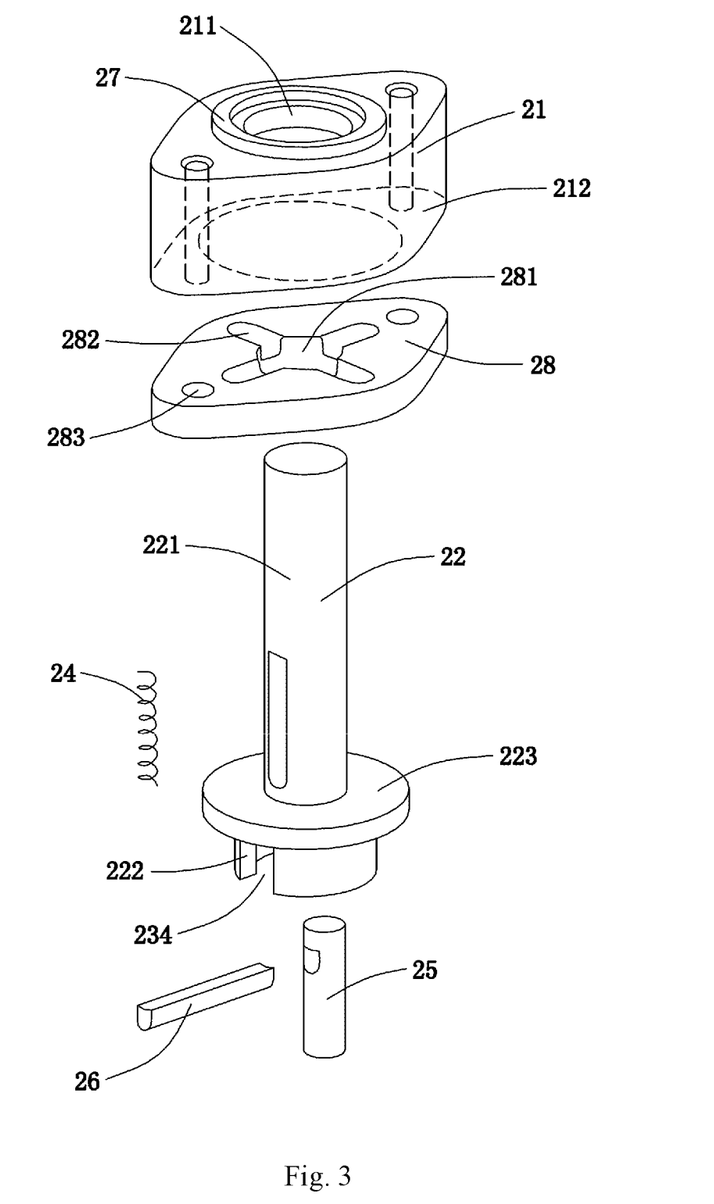
FIG. 3 is a schematic exploded perspective view showing a lock assembly of the battery lock-up mechanism in FIG. 1.

FIG. 3 is a schematic exploded perspective view showing a lock assembly of the battery lock-up mechanism in FIG. 1. Specific structures of individual parts in the lock assembly of the battery lock-up mechanism as well as their connection relationships can be easily understood with reference to this figure.

A periphery of the lock assembly 20 comprises a casing 21 and a stop end plate 28. In the illustrated example, the casing 21 has a prismatic shape at the outside, and schematically the cross section is of a diamond shape. An interior of the casing 21 has a longitudinally extending circular hole 211. An upper surface of the stop end plate 28 is formed with a cross-shaped groove 282 and a central through hole 281. The groove 282 passes through the through hole 281. In an alternative embodiment, it is also possible to replace the cross-shaped groove with another indexed groove such as a "-" shaped groove, a "*" shaped groove or a star-shaped groove. A bottom end of the casing 21 is adapted to fit with the stop end plate 28. As can be seen from the figure, the stop end plate 28 has the same cross section as the casing 21, and they has consistent outer surfaces after being assembled. It can be conceived that the casing 21 and the stop end plate 28 may also form another kind of columnar outer shape, such as a circular column shape, a quadrangular prism shape or the like.

As an example, in the illustrated embodiment, the casing 21 and the stop end plate 28 are assembled through bolt connection. As can be seen from the figure, two sides of circular hole 211 on the casing 21 are formed with elongated thread holes 212 respectively, whereas passage holes 282 are provided at corresponding positions of the stop end plate 28. Bolts can pass through the passage holes of the stop end plate 28 and are secured to the threaded holes of the casing 21 so that the stop end plate 28 and the casing 21 are assembled. Those skilled in the art can also conceive using other ways to assemble the casing and the stop end plate, such as but not limited to welding, snap-fit connection, etc.

With reference to FIGS. 1 and 3, it can be known that after assembly, the casing 21 and the stop end plate 28 define an accommodation space, in which a part of the central pull shaft 22 that passes through, and the locking pin 26 or the like are accommodated. In order to realize an advantageous of guiding and reducing shock/noise, at the top of the circular hole 211 of the casing 21, a washer 27 (e.g., made of rubber) may be also optionally provided.

The hollow central pull shaft 22 itself includes a columnar portion 221, a flange portion 223 and a lug portion 222. The hollow central pull shaft 22 is hollow. And the hollow central pull shaft 22 is closed at a top end of the columnar portion 221 while open at the end of the flange portion 223 and the lug portion 222. A top portion of the columnar portion 221 can be formed with a locking section having an external thread. The locking section is adapted to pass through the casing 21, the stop end plate 28 and the accommodation space defined by them as well, and thus to engage with the fixing assembly 10. Specifically, the locking section engages with the threaded hole 122 in the locking plate 12. The columnar portion 221 can be of a circular column shape. The flange portion 223 is of a circular disc shape, and has a diameter larger than that of the columnar portion 221 and that of the lug portion 222.

The columnar portion 221 is formed with a longitudinal notch at a position adjacent to the flange portion 223. The notch passes through a center of the columnar portion 221 and radially penetrates the columnar portion 221. When the central pull shaft 22 is assembled, the columnar portion 221 passes through the stop end plate 28, and the stop end plate 28 abuts against the flange portion 223. Then, a return spring 24 and a push rod 25 are sequentially pushed into a cavity of the hollow pull shaft 22 from the end of the lug portion 222, and after a through hole in the push rod 25 passes through the flange portion 223 and the stop end plate 28, the locking pin 26 is inserted from the notch and passes through the through hole in the push rod 25. Therefore, the stop end plate 28, the central pull shaft 22, the return spring 24, the push rod 25 and the locking pin 26 form a lock core sub-assembly.

An outer surface at the top of the locking section of the columnar portion 221 is formed with an external thread for connecting to the thread hole 122 in the fixing assembly 10 (e.g., in the locking plate 12). It can be understood that the threaded connection of the central pull shaft of the lock assembly and the locking plate of the fixing assembly is merely exemplary herein. Those skilled in the art can also conceive other connecting ways in which the lock assembly has a first connection structure and the fixing assembly has a second connection structure. For example, they can be connected by hanging or the like. That is, a laterally disposed hanging plate which serves as the first connection structure can be provided on the locking section of the central pull shaft of the lock assembly (which is fixed onto the battery housing), and an elongated groove for passing the hanging plate is disposed on the locking plate of the fixing assembly (which is fixed onto the body of automobile). Herein, the locking plate serves as the second connection structure. After the hanging plate is rotated through the elongated groove by a certain angle, it is hung onto the locking plate, thus realizing locking-up. With reference to the illustrated embodiment of the application, the first connection structure is an external thread structure, and the second connection structure is an internal thread structure.

The casing 21 can engage with the stop end plate 28 so as to form the lock assembly 20 together with the lock core sub-assembly. It can be understood that in the lock assembly, under the action of the return spring 24, the columnar portion 221 of the central pull shaft 22 will protrude upward as much as possible in the through hole at the top of the casing 21 so that the circular flange abuts against the stop end plate 28. Meanwhile, the return spring 24 pushes the push rod 25 downward so that the locking pin 26 abuts against the stop end plate 28. It can be known from the figure that at an appropriate angle, the locking pin 26 will sink into the groove in the stop end plate 28, thus limiting a circumferential rotation of the locking pin 26, the push rod 25 and the central pull shaft 22. When it is required to rotate the central pull shaft 22, the following operations should be performed: firstly, the push rod 25 is pushed from the bottom of the lock assembly 20, and when the push rod 25 is moved such that the locking pin 26 exits the groove in the stop end plate, the lug portion of the central pull shaft can be driven in a circumferential direction by hand or an appropriate tool so as to realize the rotation of the central pull shaft.

With reference to the embodiment of FIG. 1, when the central pull shaft 22 is in the lock assembly 20, the locking section is adapted to pass through the through hole 211 at the top of the casing 21, protrude out of the through hole 211, extend through an intermediate hole 115 in the second side wall 112 of the fixing frame 11, and be connected to the bolt hole 122 in the locking plate 12, whereas the circular flange 223 is restricted outside the stop end plate 28, and the lug portion 222 is also located outside the accommodation space. The diameter of the flange portion 223 of the central pull shaft 22 is larger than that of the through hole in the stop end plate 28, and therefore the flange portion 223 will not enter the accommodation space defined by the casing 21 and the stop end plate 28 from the through hole at the center of the stop end plate 28. In this way, the central pull shaft 22 will pull the lock assembly 20 tightly towards the fixing assembly 10 so that the lock assembly 20 tightly locks the battery to the body of automobile.

The lug portion 222 protrudes out of the flange portion of the central pull shaft in an opposite to the columnar portion, and is formed at a bottom end with a structural feature for facilitating operation, such as an engagement groove 234 or the like, so that a circumferential rotational adjustment of the central pull shaft 22 by professionals or dedicated tools can be made easier.

FIG. 4 is an example showing the arrangement of the battery lock-up mechanism on the chassis of automobile. The encircled positions 31 in the figure are schematic positions of the battery lock-up mechanism. It can be seen that in the example, in order to ensure the stability of battery installation, a total of eight battery lock-up mechanisms are provided on the chassis frame 30, i.e., two in the front, two at the rear, two on the left and two on the right. Specifically, fixing assemblies are disposed at these corresponding positions on the chassis frame of automobile, and lock assemblies are disposed at corresponding positions on the power battery for automobile. In this way, after the power battery for automobile and the body of automobile are aligned, individual lock assemblies will align with corresponding fixing assemblies, and the power battery for automobile will be fixed to the body of automobile by tightly locking the lock assembly and the fixing assemblies. It can be understood that in an alternative embodiment, those skilled in the art can install the battery lock-up mechanisms with another number and at other positions.

The fixing assembly 10 can be connected to the chassis frame 30 of automobile through bolts 13, and the lock assembly 20 can be fixed to a housing member of the battery via a liner cylinder that is not shown. In the locked position, the locking section of the central pull shaft 22 may extend through the liner cylinder and the fixing frame 10 so as to be connected together with the locking plate 12, thus fixing the battery to the body of automobile. In an alternative embodiment, the lock assembly can be fixed to the housing member of battery by using any other method, or the fixing assembly can be fixed to the body of automobile by using any other method, and a detailed list of the method is not given herein.

Specifically, in an assembling method, the lock assembly 20 can be firstly assembled to the liner cylinder by a close form fit, and then the liner cylinder is welded to an installation hole of the housing member of the battery. The installation hole can be made by casting or drilling in advance. For example, the lock assembly 20 and the liner cylinder are assembled by induction shrink assembly method: when the lock assembly 20 is assembled to the liner cylinder, a heat induction coil can be wound around the liner cylinder for performing induction heating on the liner cylinder; after the liner cylinder is expanded due to being heated, the lock assembly 20 is nested within the liner cylinder; after a normal temperature is restored, the lock assembly 20 and the liner cylinder are closely fixed together so as to realize tight interference fit. Optionally, during assembling, the lock assembly 20 can be also cooled in the meantime for shrinking, for further facilitating assembling the lock assembly 20 and the liner cylinder. When the liner cylinder is welded to the battery housing, the welding spots can be advantageously distributed at the periphery of the bottom and open end of the liner cylinder.

It can be understood that from the description of the application that, the application has taught a power battery for new energy automobile, and the battery housing of the power battery for automobile can be provided with the above described lock assembly.

In combination with the above detailed description, it can be known that the method for installing/detaching a power battery for automobile onto/from a new energy automobile by using the battery lock-up mechanism according to the illustrated embodiment of the invention comprises (but is not limited to) the following steps: wherein the installing steps comprise: (1) aligning the power battery for automobile having the lock assembly for the battery lock-up mechanism with the body of new energy vehicle which is connected with the fixing assembly for the battery lock-up mechanism; (2) pushing the push rod upward (by professionals or dedicated tools) so that the locking pin is disengaged from the groove of the stop end plate, and then driving the lug portion circumferentially so as to rotate the central pull shaft and make the central pull shaft engage with the locking plate; and (3) releasing the push rod when an appropriate locking angle or torque is reached so that the return spring pushes the central pull shaft to return to the position of the locking pin in the groove of the stop end plate, thus restricting turning of the central pull shaft; and/or the detaching steps comprise: (1) pushing the push rod upward (by professionals or dedicated tools) so that the locking pin is disengaged from the groove of the stop end plate, and then driving the lug portion circumferentially so as to rotate the central pull shaft and make the central pull shaft disengage from the locking plate; (2) releasing the push rod after the central pull shaft is disengaged from the locking plate so that the return spring pushes the central pull shaft to return to the position of the locking pin in the groove of the stop end plate, thus restricting turning of the central pull shaft; and (3) moving the power battery for automobile having the lock assembly away from the body of automobile.

In combination with the above description, it can be known that the application has further taught a new energy automobile comprising the above described lock assembly, and meanwhile further teaches a new energy automobile comprising the above described battery lock-up mechanism, which comprises a power battery for automobile fixed to the body of automobile or other positions of automobile through the battery lock-up mechanism. Specifically, the lock assembly can be fixed to the power battery for automobile through an intermediate connector, and the lock assembly is fixed inside the intermediate connector through interference fit. The intermediate connector can be fixed to the battery housing of the power battery for automobile by welding. Specifically, the intermediate connector is a sleeve which is welded inside a bore in the battery housing. Alternatively, the intermediate connector can be a cast bracket adapted to be welded to a side face of the battery housing, and the cast bracket has a bore for accommodating the lock assembly.

On this basis, those skilled in the art can easily obtain other types of new energy vehicles comprising the same lock assembly or battery lock-up mechanism, according to the example of new energy automobile.

The technical scope of the invention is not merely limited to the content of the above description, and those skilled in the art can make various variations and modifications on the above embodiments under the premise of not departing from the technical ideas of the invention, all of which will fall within the scope of the invention.

What is claimed is:

1. A lock assembly for a battery lock-up mechanism, wherein the battery lock-up mechanism further comprises a fixing assembly for connecting to a new energy vehicle, the lock assembly comprising:
   a hollow casing which is opened at a bottom end and has a first through hole at a top end;
   a stop end plate formed with a second through-hole at the center of the stop end plate and formed with a groove in an indexed arrangement that passes through the second through-hole, the stop end plate and the casing engaging with each other to define an accommodation space; and
   a hollow central pull shaft having a columnar portion, a lug portion, and a flange portion between the columnar portion and the lug portion, the columnar portion having a closed top end that passes through the second through hole of the stop end plate and the first through hole of the casing, the closed top end having a first connection structure for engaging with a second connection structure on the fixing assembly for restricting a relative axial movement of the fixing assembly and the lock assembly, the columnar portion being formed with a radially penetrating notch at a position adjacent to the flange portion, and the flange portion having a diameter larger than a diameter of the columnar portion and a diameter of the lug portion, and also larger than a diameter of the second through hole;
   the lock assembly further comprises a return spring, a push rod and a locking pin, wherein:
   the return spring is positioned in the hollow central pull shaft, one end of the push rod has a radially penetrating third through hole and extends into the hollow central pull shaft, another end of the push rod extends out of the hollow central pull shaft from the lug portion of the hollow central pull shaft, the return spring urges the push rod, and the locking pin passes through the radially penetrating notch of the columnar portion of the hollow central pull shaft and the radially penetrating third through hole of the push rod in the accommodation space.

2. The lock assembly according to claim 1, wherein the casing is of a columnar shape.

3. The lock assembly according to claim 1, wherein the flange portion of the central pull shaft is of a circular disc shape.

4. The lock assembly according to claim 1, wherein the groove in the indexed arrangement is a dash-shaped groove, a cross-shaped groove, an asterisk-shaped groove or a star-shaped groove.

5. The lock assembly according to claim 1, wherein the first connection structure is an external thread.

6. The lock assembly according to claim 1, wherein a washer is disposed in the first through hole of the casing.

7. The lock assembly according to claim 1, wherein the stop end plate is bolt-connected, adhered or welded to a bottom end of the casing.

8. A power battery for a new energy vehicle, wherein a battery housing of the power battery is provided with the lock assembly according to claim 1.

9. A battery lock-up mechanism, wherein the battery lock-up mechanism comprises a lock assembly for connecting to a battery housing of a power battery for a new energy vehicle, wherein the lock assembly is the lock assembly according to claim 1, and the battery lock-up mechanism further comprises the fixing assembly for connecting to the new energy vehicle.

10. The battery lock-up mechanism according to claim 9, wherein the fixing assembly comprises a fixing frame and a locking plate, the locking plate is assembled to the new energy vehicle through the fixing frame, and the central pull shaft engages with the locking plate.

11. A new energy vehicle, wherein the new energy vehicle comprises a power battery assembled using the battery lock-up mechanism according to claim 9.

12. The new energy vehicle according to claim 11, wherein the lock assembly is fixed to the power battery through an intermediate connector, the lock assembly is connected inside the intermediate connector through interference fit, and the intermediate connector is fixed to a battery housing of the power battery by welding.

13. The new energy vehicle according to claim 12, wherein the intermediate connector is a sleeve which is welded inside a bore in the battery housing.

14. The new energy vehicle according to claim 11, wherein the new energy vehicle is a new energy automobile, and the fixing assembly is connected to a chassis of a body of the new energy automobile.

15. A method for installing/detaching a power battery onto/from a new energy vehicle by using the battery lock-up mechanism according to claim 9, wherein the installing steps comprise: (1) aligning the power battery having the lock assembly for the battery lock-up mechanism with the new energy vehicle which is connected with the fixing assembly for the battery lock-up mechanism; (2) pushing the push rod upward so that the locking pin is disengaged from the groove of the stop end plate, and then driving the lug portion circumferentially so as to rotate the central pull shaft and make the central pull shaft engage with the locking plate; and (3) releasing the push rod when an appropriate locking angle or torque is reached so that the return spring pushes the central pull shaft to return to the position of the locking pin in the groove of the stop end plate, thus restricting turning of the central pull shaft; and the detaching steps comprise: (1) pushing the push rod upward so that the locking pin is disengaged from the groove of the stop end plate, and then driving the lug portion circumferentially so as to rotate the central pull shaft and make the central pull shaft disengage from the locking plate; (2) releasing the push rod after the central pull shaft is disengaged from the locking plate so that the return spring pushes the central pull shaft to return to the position of the locking pin in the groove of the stop end plate, thus restricting turning of the central pull shaft; and (3) moving the power battery having the lock assembly away from a body of the new energy vehicle.

16. A power battery for a new energy vehicle, wherein a battery housing of the power battery is provided with the lock assembly according to claim 7.

17. A battery lock-up mechanism, wherein the battery lock-up mechanism comprises a lock assembly for connecting to a battery housing of a power battery for a new energy vehicle, wherein the lock assembly is the lock assembly according to claim 2, and the battery lock-up mechanism further comprises the fixing assembly for connecting to the new energy vehicle.

18. A new energy vehicle, wherein the new energy vehicle comprises a power battery assembled using the battery lock-up mechanism according to claim 10.

19. The new energy vehicle according to claim 12, wherein the new energy vehicle is a new energy automobile, and the fixing assembly is connected to a chassis of a body of the new energy automobile.

20. A method for installing/detaching a power battery onto/from a new energy vehicle by using the battery lock-up mechanism according to claim 10, wherein the installing steps comprise: (1) aligning the power battery having the lock assembly for the battery lock-up mechanism with the new energy vehicle which is connected with the fixing assembly for the battery lock-up mechanism; (2) pushing the push rod upward so that the locking pin is disengaged from the groove of the stop end plate, and then driving the lug portion circumferentially so as to rotate the central pull shaft and make the central pull shaft engage with the locking plate; and (3) releasing the push rod when an appropriate locking angle or torque is reached so that the return spring pushes the central pull shaft to return to the position of the locking pin in the groove of the stop end plate, thus restricting turning of the central pull shaft; and the detaching steps comprise: (1) pushing the push rod upward so that the locking pin is disengaged from the groove of the stop end plate, and then driving the lug portion circumferentially so as to rotate the central pull shaft and make the central pull shaft disengage from the locking plate; (2) releasing the push rod after the central pull shaft is disengaged from the locking plate so that the return spring pushes the central pull shaft to return to the position of the locking pin in the groove of the stop end plate, thus restricting turning of the central pull shaft; and (3) moving the power battery having the lock assembly away from a body of the new energy vehicle.

* * * * *